(12) United States Patent
Nakao et al.

(10) Patent No.: US 7,732,045 B2
(45) Date of Patent: Jun. 8, 2010

(54) FILM FOR MEMBRANE STRUCTURE

(75) Inventors: Takuya Nakao, Chiyoda-ku (JP);
Masaru Yamauchi, Chiyoda-ku (JP);
Tutomu Fusyuku, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 487 days.

(21) Appl. No.: 11/697,864

(22) Filed: Apr. 9, 2007

(65) Prior Publication Data

US 2007/0243373 A1  Oct. 18, 2007

(30) Foreign Application Priority Data

Apr. 12, 2006  (JP)  ............... 2006-109593

(51) Int. Cl.
*B32B 27/08* (2006.01)
*B32B 27/16* (2006.01)
*B32B 27/20* (2006.01)
*B32B 27/26* (2006.01)
*B32B 27/28* (2006.01)
*B32B 33/00* (2006.01)

(52) U.S. Cl. ............ 428/339; 428/421; 428/422; 428/447; 428/448

(58) Field of Classification Search ............ None
See application file for complete search history.

(56) References Cited

U.S. PATENT DOCUMENTS 6,335,061 B1 *  1/2002  Kanamori et al. ........... 427/515

2002/0091201 A1  7/2002  Michot et al.

FOREIGN PATENT DOCUMENTS

| EP | 0 071 170 A2 | 2/1983 |
|---|---|---|
| JP | 63-222852 | 9/1988 |
| JP | 3-188132 | 8/1991 |
| JP | 8-5976 | 1/1996 |
| JP | 3523787 | 2/2004 |
| JP | 2005-271340 | 10/2005 |
| WO | WO 99/38897 | 8/1999 |
| WO | WO 99/44245 | 9/1999 |
| WO | WO 2005/003441 A1 | 1/2005 |
| WO | WO 2005/003442 A1 | 1/2005 |
| WO | WO 2005/003444 A1 | 1/2005 |

* cited by examiner

*Primary Examiner*—Ramsey Zacharia
(74) *Attorney, Agent, or Firm*—Oblon, Spivak, McClelland, Maier & Neustadt, L.L.P.

(57) ABSTRACT

A film for a membrane structure, which comprises a film substrate containing a fluororesin, a photocatalyst layer and an interlayer interposed between the film substrate and the photocatalyst layer, wherein the fluororesin is at least one member selected from the group consisting of an ethylene/tetrafluoroethylene copolymer, a tetrafluoroethylene/hexafluoropropylene copolymer, a tetrafluoroethylene/perfluoro(alkyl vinyl ether) copolymer, a polyvinyl fluoride and a polyvinylidene fluoride; the interlayer contains an organic-inorganic hybrid polymer obtained by hydrolyzing/co-condensing at least one member selected from the group consisting of an organosilane, a hydrolysate of an organosilane and a condensate of an organosilane, and a silyl group-containing organic polymer; and the mass remaining ratio of the organic-inorganic hybrid polymer is from 50 to 80% at 500° C. measured by thermogravimetric analysis.

5 Claims, 1 Drawing Sheet

FILM FOR MEMBRANE STRUCTURE

CROSS-REFERENCE TO RELATED APPLICATIONS

The present application claims priority to Japanese patent application JP 2006-109593, filed on Apr. 12, 2006.

FIELD OF THE INVENTION

The present invention relates to a film for a membrane structure having an antifouling property by photocatalytic activity.

DISCUSSION OF THE BACKGROUND

A film made of a fluororesin, a fluororesin composite or the like is light in weight and excellent in weather resistance, mechanical strength, etc. and therefore, used as the roof, the outer wall etc. in facilities such as sports facilities (such as a swimming pool, a gymnasium, a tennis court and a football ground), warehouses, halls, exhibition halls and horticultural facilities (such as a horticultural greenhouse and an agricultural greenhouse) (for example, JP-A-3-188132, JP-A-63-222852, JP-B-8-5976). Hereinafter, a roof, an outer wall, facilities or the like using a film will be referred to as a membrane structure. Further, a film to be used for a membrane structure will be referred to as a film for a membrane structure.

However, the film made of a composite of glass fibers and a fluororesin such as a polytetrafluoroethylene has the following problems.

The film has insufficient transparency and has a low sunlight transmittance, and is thereby unsuitable as a film for a membrane structure for horticultural facilities or for sports facilities in which glass grows.

The film has insufficient transparency, through which the surrounding landscape cannot be viewed, and thus when it is used for a hall, an exhibition hall or the like, the interior of such a structure will be insufficient in wide open feeling.

On the other hand, a film made of a fluororesin having high transparency such as an ethylene/tetrafluoroethylene copolymer has a high sunlight transmittance and is thereby suitable for a film for a membrane structure to be used for horticultural facilities (JP-B-08-5976), sports facilities in which grass grows, exhibition halls, etc.

However, even when a film made of a fluororesin having high transparency is used, its transparency decreases if the surface of the film is fouled. Accordingly, such a film is desired that dirt attached to the film spontaneously decomposes to prevent a decrease in transparency. As such a film, a film comprising a photocatalyst layer on a film substrate has been known. However, this film has such a problem that when it is left to stand outside for a long time, the film substrate itself undergoes oxidative decomposition by the photocatalyst, i.e. the film has insufficient weather resistance. Further, the film has such a problem that the adhesion of the photocatalyst layer to the film substrate is insufficient.

As a technique to suppress oxidative decomposition of the substrate by the photocatalyst and to improve adhesion of the photocatalyst layer, a technique of providing an interlayer between a photocatalyst layer and a substrate layer has been known.

(1) A building material which comprises an interlayer made of a silicone resin interposed between a coating film of e.g. a fluororesin formed on a substrate of e.g. aluminum and a photocatalyst layer (Japanese Patent No. 3523787).

(2) A moisture condensation-preventing film which comprises an interlayer made of a silicone resin interposed between a film substrate of e.g. a fluororesin and a photocatalyst layer (JP-A-2005-271340).

However, when the building material (1) is left to stand outside for a long time, the coating film of e.g. a fluororesin will undergo oxidative decomposition, since the interlayer itself is likely to undergo oxidative decomposition by the photocatalyst. Further, once the interlayer undergoes oxidative decomposition, cracking or whitening will occur in the photocatalyst layer.

The moisture condensation-preventing film (2) is assumed to be bonded to another substrate by means of an adhesive layer, and accordingly, the film substrate is thin and the film has insufficient mechanical strength. Further, as the silicone resin for the interlayer is hard, if the film is left to stand outside for a long time without being bonded to another substrate, the interlayer cannot follow the elongation of the film substrate, thus resulting in cracking in the interlayer and the photocatalyst layer.

As mentioned above, the building material (1) and the moisture condensation-preventing film (2) are insufficient in weather resistance and durability. Thus, a film for a membrane structure excellent in weather resistance will not be obtained even when the interlayer in (1) or (2) is applied as it is to the film for a membrane structure comprising a photocatalyst layer on a film substrate.

SUMMARY OF THE INVENTION

Under these circumstances, the present invention provides a film for a membrane structure having an antifouling property by photocatalytic activity, having high transparency and being excellent in weather resistance.

The film for a membrane structure of the present invention comprises a film substrate containing a fluororesin, a photocatalyst layer and an interlayer interposed between the film substrate and the photocatalyst layer, wherein the fluororesin is at least one member selected from the group consisting of an ethylene/tetrafluoroethylene copolymer, a tetrafluoroethylene/hexafluoropropylene copolymer, a tetrafluoroethylene/perfluoro(alkyl vinyl ether) copolymer, a polyvinyl fluoride resin and a polyvinylidene fluoride resin; the interlayer is a layer containing an organic-inorganic hybrid polymer obtained by hydrolyzing/co-condensing at least one member selected from the group consisting of an organosilane, a hydrolysate of an organosilane and a condensate of an organosilane, and a silyl group-containing organic polymer; and the organic-inorganic hybrid polymer is a polymer providing a mass remaining ratio of from 50 to 80% at 500° C. measured by thermogravimetric analysis.

The film for a membrane structure of the present invention preferably has a total light transmittance of at least 80% measured in accordance with JIS K7105.

The film substrate preferably has a thickness of from 50 to 500 μm, an Elmendorf tear strength of at least 7 N measured based on JIS K7128, and a tensile strength of at least 46 MPa measured based on JIS K7127.

The fluororesin is preferably an ethylene/tetrafluoroethylene copolymer.

The rate of elongation of the interlayer is preferably from 60 to 120%.

The film for a membrane structure of the present invention is preferably such that the adhesion between the film substrate and the interlayer is at least 85% measured by a cross-cut method stipulated in JIS K5600, the water contact angle on the surface of the photocatalyst layer after the following weather resistance test is at most 400, and the change in haze is at most 5% as between before and after the following weather resistance test.

Weather resistance test: while the film is irradiated with ultraviolet rays at a wavelength of from 300 to 400 nm at an intensity of 100 mW/cm$^2$, a cycle comprising (i) irradiation with ultraviolet rays at a temperature of 63° C. at a relative humidity of 50% RH for 10 hours, (ii) a shower for 20 seconds, (iii) moisture condensation for 2 hours, and (iv) a shower for 20 seconds, is repeatedly carried out for 200 hours.

The film for a membrane structure of the present invention is preferably such that the change in haze is at most 3% between before and after the above weather resistance test.

The film for a membrane structure of the present invention has an antifouling property by photocatalytic activity, has high transparency and is excellent in weather resistance.

BRIEF DESCRIPTION OF THE FIGURE

In the accompanying drawing.

Figure 1:
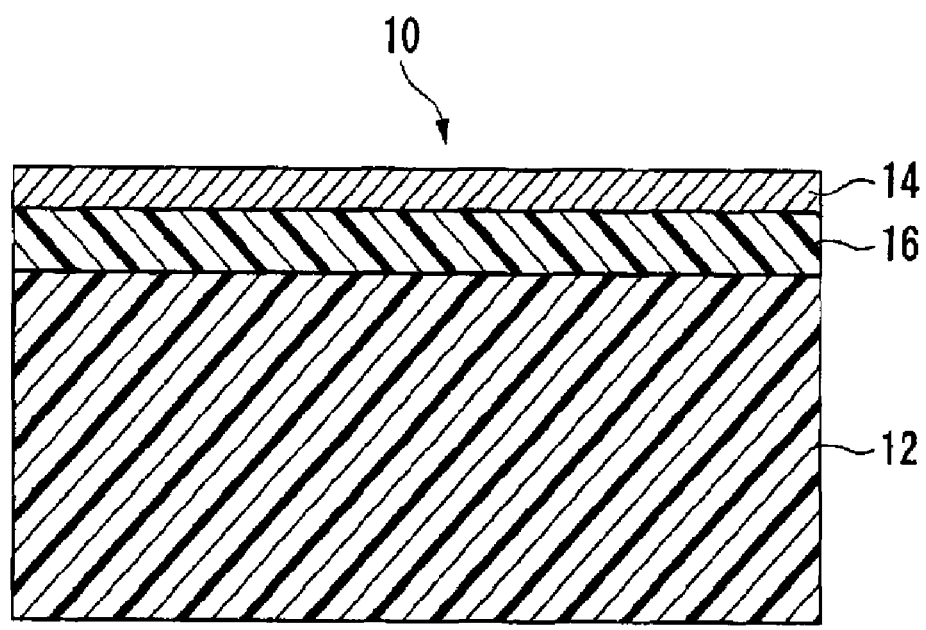
FIG. 1 is a cross-section illustrating one example of the film for a membrane structure of the present invention.

Now, the present invention will be described in detail with reference to the preferred embodiments.

FIG. 1 is a cross-section illustrating one example of the film for a membrane structure of the present invention. The film 10 for a membrane structure is a laminate film comprising a film substrate 12, a photocatalyst layer 14 and an interlayer 16 interposed between the film substrate 12 and the photocatalyst layer 14.

DETAILED DESCRIPTION OF THE INVENTION

Film Substrate

The film substrate is a film made of a fluororesin.

The fluororesin is at least one member selected from the group consisting of an ethylene/tetrafluoroethylene copolymer (ETFE), a tetrafluoroethylene/hexafluoropropylene copolymer (FEP), a tetrafluoroethylene/perfluoro(alkyl vinyl ether) copolymer (PFA), a polyvinyl fluoride (PVF) and a polyvinylidene fluoride (PVDF). Such a fluororesin is excellent in transparency. The fluororesin is preferably ETFE which has excellent transparency, processability and mechanical strength.

The film substrate may contain another resin other than the fluororesin, known additives, etc. within a range not to impair the object of the present invention.

Surface treatment may be applied to the film substrate as the case requires. By the surface treatment, wettability of the film substrate will improve, whereby the adhesion between the interlayer and the film substrate will improve. The surface treatment may, for example, be a known treatment such as plasma treatment, corona discharge treatment, ultraviolet treatment, ozone treatment, chemical treatment using an acid, an alkali or the like, or physical treatment using an abrasive. The surface tension of the film substrate is preferably at least 38 mN/m.

The thickness of the film substrate is preferably from 50 to 500 µm in view of transparency and mechanical strength, particularly preferably from 80 to 250 µm.

The film substrate preferably has an Elmendorf tear strength of at least 7 N and a tensile strength (break strength) of at least 46 MPa. When the Elmendorf tear strength and the tensile strength are within the above range, the film for a membrane structure is less likely to be torn or broken, even when an external force due to a flying object, strong wind or snow fallen on the film is applied thereto. Further, the growth of plant in the membrane structure will not be inhibited. Further, a wide open feeling as if a person is outside can be produced.

The Elmendorf tear strength is measured using a commercially available apparatus (for example, Elmendorf tearing tester manufacture by Toyo Seiki Seisaku-Sho, Ltd.) based on JIS K7128.

The tensile strength (break strength) is measured using a commercially available apparatus (for example, RTC-1210A, manufactured by ORIENTEC Co., LTD.) based on JIS K7127. The sample shape is a #5 dumbbell shape, and the rate is 200 mm/min.

(Photocatalyst Layer)

The photocatalyst layer is a layer containing a photocatalyst. The amount of the photocatalyst is properly determined depending upon the antifouling property required for the film for a membrane structure.

The photocatalyst is a material having a nature capable of forming conduction electrons and holes by excitation of electrons in the valence band when irradiated with a light having an energy greater than the energy difference between the valence band and the conduction band of the photocatalyst. The photocatalyst may be an ultraviolet-responsive photocatalyst or a visible light-responsive photocatalyst.

The photocatalyst may, for example, be anatase titanium oxide, rutile titanium oxide, tin oxide, zinc oxide, tungsten trioxide, ferric oxide, strontium titanate, bithmus oxide or iron oxide, and titanium oxide is particularly preferred.

The thickness of the photocatalyst layer is preferably from 0.03 to 0.8 µm, particularly preferably from 0.06 to 0.4 µm. When the thickness of the photocatalyst layer is at least 0.03 µm, the antifouling property by the photocatalytic activity will be sufficiently obtained. When the thickness of the photocatalyst layer is at most 0.8 µm, an increase in haze, cracking, a decrease in adhesion, etc. can be sufficiently suppressed. A photocatalyst layer having very fine cracking is not practically problematic unless the cracking is visually confirmed.

The water contact angle of the photocatalyst layer is preferably at most 55°, particularly preferably at most 40°, with a view to suppressing stains such as streaks made by rain.

The photocatalyst layer may be formed by a wet method such as a sol-gel process or a dry method such as a CVD method.

The sol-gel process comprises applying a sol of a metal alkoxide to the interlayer, followed by hydrolysis and condensation to form a gel which lost fluidity, and heating the gel to form a film of the metal oxide.

Another wet method other than the sol-gel process may, for example, be a method of applying a composition for a photocatalyst layer containing fine photocatalyst particles and a medium to the interlayer by a known coating method, followed by drying.

By use of fine titanium oxide particles as the fine photocatalyst particles, a film of titanium oxide can be formed. The titanium oxide film may be a composite film with another metal or metal oxide other than titanium oxide. Such a composite film is preferably a composite film of titanium oxide with silica, with which high hydrophilicity can be maintained for a long time and dirt decomposability can be developed.

The amount of the fine photocatalyst particles is preferably from 0.08 to 50 mass % in the composition for a photocatalyst layer (100 mass %), more preferably from 1 to 40 mass %, most preferably from 5 to 35 mass %.

The composition for a photocatalyst layer may contain a binder component. The binder may, for example, be a silicon compound, a zirconium compound, an aluminum compound or a titanium compound. The silicon compound may, for example, be a hydrolysable silane derivative; a product obtained by dehydration condensation of a partial hydrolysate of a hydrolysable silane derivative and a partial hydrolysate of a silane compound or the like; or a silicone resin.

The coating method may, for example, be dip coating, spin coating, spray coating, bar coating, knife coating, roll coating, blade coating, die coating or gravia coating.

(Interlayer)

The interlayer is a layer made of an organic-inorganic hybrid polymer. The organic-inorganic hybrid polymer is excellent in balance between weather resistance and the adhesion to the film substrate.

The organic-inorganic hybrid polymer is a polymer obtained by hydrolyzing/co-condensing at least one member selected from the group consisting of an organosilane, a hydrolysate of an organosilane, a condensate of an organosilane, and a silyl group-containing organic polymer.

The organosilane is preferably a compound of the following formula (1) (hereinafter referred to as a compound (1)):

$$(R^1)_n Si(OR^2)_{4-n} \tag{1}$$

wherein $R^1$ is a $C_{18}$ organic group, $R^2$ is a $C_{1-5}$ alkyl group or a $C_{1-6}$ acyl group, and n is an integer of from 0 to 2.

$R^1$ may, for example, be an alkyl group such as a methyl group, an ethyl group, a propyl group, a butyl group, a hexyl group, a heptyl group, an octyl group or a 2-ethylhexyl group; an acyl group such as an acetyl group, a propionyl group, a butyryl group or a benzoyl group; a vinyl group, an allyl group, a cyclohexyl group or a phenyl group. When two or more $R^1$ are present, they may be the same groups or different groups.

$R^2$ may, for example, be a $C_{1-5}$ alkyl group such as a methyl group, an ethyl group, a propyl group, a butyl group or a pentyl group; or a $C_{1-6}$ acyl group such as an acetyl group, a propionyl group or a butyryl group. $R^2$ may be the same groups or different groups.

Specific examples of the compound (1) include tetraalkoxysilanes (n=0) such as tetramethoxysilane, tetraethoxysilane, tetra-n-propoxysilane, tetra-i-propoxysilane and tetra-n-butoxysilane; trialkoxysilanes (n=1) such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane and n-octyltrimethoxysilane; and dialkoxysilanes (n=2) such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane and di-n-octyldiethoxysilane.

The compounds (1) may be used alone or as a mixture of two or more of them.

The compound (1) may be used as a hydrolysate or a condensate.

The silyl group-containing organic polymer is an organic polymer having a silyl group having a silicon atom bonded to a hydrolysable group and/or a hydroxyl group at the terminal and/or in the side chains of the organic polymer.

The silyl group-containing organic polymer may, for example, be a silyl group-containing acrylic resin, a silyl group-containing vinyl resin, a silyl group-containing urethane resin, a silyl group-containing epoxy resin, a specific silyl group-containing polyester resin or a specific silyl group-containing fluororesin.

The silyl group is preferably a group of the following formula (2):

$$-SiX_m(R^3)_{3-m} \tag{2}$$

wherein X is a hydrolysable group or a hydroxyl group, $R^3$ is a hydrogen atom, a $C_{1-10}$ alkyl group or a $C_{1-10}$ aralkyl group, and m is an integer of from 1 to 3.

The hydrolysable group may, for example, be a halogen atom, an alkoxyl group, an acetoxy group, a phenoxy group, a thioalkoxyl group or an amino group.

The organic-inorganic hybrid polymer is obtained by adding a hydrolysis/condensation catalyst and water to the compound (1) and the silyl group-containing organic polymer to hydrolyze/co-condensing the compound (1) and to the silyl group-containing organic polymer.

The hydrolysis/condensation catalyst may, for example, be an acidic compound, an alkaline compound, a salt compound, an amine compound or an organic metal compound, or a partial hydrolysate thereof.

The acidic compound may, for example, be acetic acid, hydrochloric acid, sulfuric acid or phosphoric acid.

The alkaline compound may, for example, be sodium hydroxide or potassium hydroxide.

The salt compound may, for example, be an alkali metal salt.

The organic metal compound may, for example, be an organic metal compound of tetravalent tin.

The amine compound may, for example, be 3-aminopropyltrimethoxysilane, 3-aminopropyltriethoxysilane or 3-(2-aminoethyl)-aminopropyltrimethoxysilane.

The mass remaining ratio of the organic-inorganic hybrid polymer at 500° C. measured by thermogravimetric analysis is from 50 to 80%, particularly preferably from 55 to 75%. The mass remaining ratio indicates the proportion of inorganic components contained in the organic-inorganic hybrid polymer. When the mass remaining ratio is at least 50%, oxidative decomposition of the interlayer and the film substrate by the photocatalyst can be sufficiently suppressed. Further, when the mass remaining ratio is at most 80%, the interlayer will not be too hard, the adhesion and followability to the film substrate will improve, and cracking in the photocatalyst layer will be sufficiently suppressed.

The mass remaining ratio at 500° C. measured by thermogravimetric analysis is determined as follows.

The organic-inorganic hybrid polymer is dried at 100° C. for one hour, and the mass (mass before heating) of the organic-inorganic hybrid polymer is measured. The organic-inorganic hybrid polymer is heated in the air at a heating rate of 10° C./min by using a thermogravimetric analyzer, and the mass of the remaining polymer at 500° C. is measured to determine the mass remaining ratio from the following formula:

Mass remaining ratio(%)=(mass of the remaining polymer (g)/mass before heating (g))×100

The rate of elongation of the interlayer is preferably from 60 to 120%, more preferably from 70 to 110%. When the rate of elongation is at least 60%, followability to the film substrate will improve, and cracking and whitening of the photocatalyst layer will be suppressed. When the rate of elongation is at most 120%, surface tacking of the interlayer will be suppressed, and cracking in the photocatalyst layer caused by oxidative decomposition of the interlayer will be suppressed even when the film is left to stand outside for a long time.

The rate of elongation of the interlayer is determined as follows.

An interlayer with a thickness of 1 μm is formed on a film substrate with a thickness of 200 μm to prepare a sample. The sample is cut into a strip with a width of 10 mm. The strip sample is set to a tensilon with an initial distance between marked lines of 100 mm, and the sample is drawn at a drawing rate of 100 mm/min until craze or cracking occurs in the interlayer, and the distance between marked lines when craze or cracking occurs is measured to determine the rate of elongation from the following formula:

Rate of elongation(%)=(distance between marked lines after drawing (mm)/initial distance between marked lines (100 mm)−1)×100

The interlayer may be subjected to heat polymerization by a curing agent with a view to increasing the hardness of the interlayer to a certain extent. By the heat polymerization, surface tacking of the interlayer will be suppressed, heat expansion and heat shrinkage will be suppressed, and cracking in the photocatalyst layer will be suppressed. The curing agent may, for example, be a tin compound, an aluminum compound or a zirconium compound (such as zirconia). The amount of the curing agent is preferably from 1 to 20 parts by mass per 100 parts by mass of the organic-inorganic hybrid polymer.

The interlayer may contain an inorganic filler so as to further suppress oxidative decomposition of the interlayer and the film substrate by the photocatalyst. The inorganic filler may, for example, be silica, alumina, titanium oxide which has no function as a photocatalyst, zirconia, zinc oxide or cerium oxide, and silica is preferred with a view to maintaining hydrophilicity. The amount of the inorganic filler is preferably from 1 to 50 parts by mass per 100 parts by mass of the organic-inorganic hybrid polymer.

The interlayer may contain another resin other than the organic-inorganic hybrid polymer or known additives, within a range not to impair the object of the present invention.

The thickness of the interlayer is preferably from 0.1 to 3 μm. When the thickness of the interlayer is at least 0.1 μm, sufficient adhesion to the photocatalyst layer will be obtained. When the thickness of the interlayer is at most 3 μm, cracking is less likely to occur in the photocatalyst layer.

The interlayer can be formed, for example, by a method of applying a coating fluid for an interlayer containing an organic-inorganic hybrid polymer and a is solvent and as the case requires, a curing agent and the like to the film substrate by a known coating method, followed by drying by heating. Further, the interlayer may undergo cross-linking or curing by active rays such as ultraviolet rays or electro rays after drying.

(Film for Membrane Structure)

The film for a membrane structure of the present invention has a total light transmittance of preferably at least 80%, more preferably at least 85%. The total light transmittance is measured in accordance with JIS K7105.

In the film for a membrane structure of the present invention, the adhesion between the film substrate and the interlayer is preferably at least 85% measured by a cross-cut method stipulated in JIS K5600. The adhesion is determined in accordance with JIS K5600 in such a manner that a commercially available adhesive tape is bonded to a coating film (interlayer and photocatalyst layer) cross-cut into a grid, the adhesive tape is peeled off, and the proportion of the coating film remaining on the film substrate is obtained, which is taken as the adhesion.

In the film for a membrane structure of the present invention, the water contact angle on the surface of the photocatalyst layer after the following weather resistance test is preferably at most 40°.

Of the film for a membrane structure of the present invention, the change in haze as between before and after the following weather resistance test is preferably at most 5%, more preferably at most 3%. The haze is measured in accordance with JIS K7105.

Weather resistance test: while the film is irradiated with ultraviolet rays at a wavelength of from 300 to 400 nm at an intensity of 100 mW/cm$^2$, a cycle comprising (i) irradiation with ultraviolet rays at a temperature of 63° C. at a relative humidity of 50% RH for 10 hours, (ii) a shower for 20 seconds, (iii) moisture condensation for 2 hours, and (iv) a shower for 20 seconds, is repeatedly carried out for 200 hours.

The film for a membrane structure of the present invention may have a water-soluble protective layer on the photocatalyst layer to prevent the photocatalyst layer from being damaged or being stained, at the time of processing the film and at the time of building a membrane structure. This protective layer will be washed away by rain after building a membrane structure. After the protective layer is washed away, an antifouling property will be developed by the photocatalyst layer exposed to the outermost surface.

As a material of the water-soluble protective layer, a surfactant; or an oxide of at least one metal selected from the group consisting of aluminum, silicon, titanium, zirconium, tin and zinc, may be mentioned.

The film for a membrane structure of the present invention described above, which has a photocatalyst layer, has an antifouling property by photocatalytic activity. Further, since it has a film substrate containing a specific fluororesin, it has high transparency. Further, since it has an interlayer containing an organic-inorganic hybrid polymer of which the proportion of inorganic components is within a specific range, between the film substrate and the photocatalyst layer, oxidative decomposition of the interlayer and the film substrate by the photocatalyst will be sufficiently suppressed and further, the interlayer has improved adhesion and followability to the film substrate containing a specific fluororesin, whereby cracking in the photocatalyst layer will be sufficiently suppressed. As a result, weather resistance will improve, and the antifouling property and transparency can be maintained for a long time.

On the other hand, the interlayer disclosed in Japanese Patent No. 3523787 has a low content of inorganic components, and thus when combined with a film substrate containing a specific fluororesin, it is inferior in weather resistance, since oxidative decomposition of the interlayer and the film substrate by the photocatalyst cannot be suppressed. The interlayer disclosed in JP-A-2005-271340 has a high content of inorganic components, and thus when combined with a film substrate containing a specific fluororesin, it is inferior in the adhesion and followability to such a film substrate, and cracking is likely to occur in the photocatalyst layer.

Now, the present invention will be described in further detail with reference to Examples. However, it should be understood that the present invention is by no means restricted to such specific Examples.

EXAMPLES

Examples 1 to 4 are Test Examples, Examples 5 to 12 and 17 are Examples of the present invention, and Examples 13 to 16 are Comparative Examples.

(Elmendorf Tear Strength)

It was measured by using Elmendorf tearing tester manufactured by Toyo Seiki Seisaku-Sho, Ltd. based on JIS K7128.

(Tensile Strength (Break Strength))

It was measured by using RTC-1210A manufactured by ORIENTEC Co., LTD. based on JIS K7127. The sample shape was a #5 dumbbell shape, and the rate was 200 mm/min.

(Mass Remaining Ratio at 500° C.)

The organic-inorganic hybrid polymer solution was dried at 100° C. for one hour, and the mass (mass before heating) of the organic-inorganic hybrid polymer was measured. The organic-inorganic hybrid polymer was heated in the air at a heating rate of 10° C./min by using a thermogravimetric/differential thermal analyzer (SSC5200TG/DTA220C, manufactured by SII NanoTechnology Inc.) and the mass of the remaining polymer at 500° C. was measured to determine the mass remaining ratio from the following formula:

Mass remaining ratio(%)=(mass of the remaining polymer (g)/mass before heating (g))×100

(Rate of Elongation)

An interlayer with a thickness of 1 μm was formed on a film substrate with a thickness of 200 μm to prepare a sample. The sample was cut into a strip with a width of 10 mm. The strip sample was set to a tensilon (RTC-1210A, manufactured by ORIENTEC Co., LTD.) with an initial distance between marked lines of 100 mm and drawn at a drawing rate of 100 mm/min until craze or cracking occurred in the interlayer, and the distance between marked lines when the craze or cracking occurred was measured to determine the rate of elongation from the following formula:

Rate of elongation(%)=(distance between marked lines after drawing (mm)/initial distance between marked lines (100 mm)−1)×100

(Surface Appearance)

The outer appearance of the surface of the photocatalyst layer was visually observed to confirm the presence or absence of cracking and whitening.

(Total Light Transmittance, Haze)

The total light transmittance and the haze were measured in accordance with JIS K7105 by using a turbidimeter (NDH5000W, manufactured by NIPPON DENSHOKU INDUSTRIES CO., LTD.).

(Adhesion)

The adhesion was evaluated on the basis of standards ○ (favorable): the adhesion between the film substrate and the interlayer of at least 85% by a cross-cut method stipulated in JIS K5600, and X (bad): adhesion less than 85%.

(Water Contact Angle)

The water contact angle was measured by using a contact angle measuring apparatus (CA-X, manufactured by Kyowa Interface Science Co., Ltd.).

(Weather Resistance Test)

The weather resistance test was carried out by using an ultra-accelerated weather resistance testing machine (EYE Super UV Tester SUV-W231 manufactured by IWASAKI ELECTRIC Co., Ltd.) while irradiating the film with ultraviolet rays at a wavelength of from 300 to 400 nm at an intensity of 100 mW/cm$^2$ by repeatedly carrying out a cycle comprising (i) irradiation with ultraviolet rays at a temperature of 63° C. at a relative humidity of 50% RH for 10 hours, (ii) a shower for 20 seconds, (iii) moisture condensation for 2 hours and (iv) a shower for 20 seconds, for 200 hours.

(Film Substrate)

ETFE Film:

AFLEX 200NJ, manufactured by Asahi Glass Company, Limited, thickness: 200 μm, Elmendorf tear strength: 51.8 N, tensile strength (break strength): 58.4 MPa (Coating Fluid for Interlayer)

Organic-Inorganic Hybrid Polymer Solution A:

PSP-030, manufactured by JSR Corporation, mass remaining ratio at 500° C.: 65%

Organic-Inorganic Hybrid Polymer Solution B:

FRESCERA N-A100, manufactured by Matsushita Electric Works, Ltd., two-part system, mass remaining ratio at 500° C.: 77%

Organic-Inorganic Hybrid Polymer Solution C:

Bistrator L NRC-300A, manufactured by Nippon Soda Co., Ltd., mass remaining ratio at 500SC: 36%

Silica Sol:

OSCAL 1432, manufactured by Catalysts & Chemicals Industries Co., Ltd.

(Composition for Photocatalyst Layer)

Titanium oxide photocatalyst coating liquid A: PSC-20, manufactured by JSR Corporation Titanium oxide photocatalyst coating liquid B: AGC-L, manufactured by Asahi Glass Company, Limited Titanium oxide photocatalyst coating liquid C: AGC-D, manufactured by Asahi Glass Company, Limited Titanium oxide photocatalyst coating liquid D: FRESCERA P-S1000, manufactured by Matsushita Electric Works, Ltd.

Titanium oxide photocatalyst coating liquid E: Bistrator L NRC-300C, manufactured by Nippon Soda Co., Ltd.

Example 1

Organic-inorganic hybrid polymer solution A was applied to an ETFE film the surface of which was subjected to corona discharge treatment so that the thickness after drying would be 1 μm, and dried at 100° C. for 30 minutes to form an interlayer. The rate of elongation of the interlayer was measured. The result is shown in Table 1.

Example 2

A coating fluid comprising organic-inorganic hybrid polymer solution B diluted with a solvent was applied to an ETFE film the surface of which was subjected to corona discharge treatment so that the thickness after drying would be 1 μm, and dried at 100° C. for 30 minutes to form an interlayer. The rate of elongation of the interlayer was measured. The result is shown in Table 1.

Example 3

Organic-inorganic hybrid polymer solution C was applied to an ETFE film the surface of which was subjected to corona discharge treatment so that the thickness after drying would be 1 μm, and dried at 100° C. for 30 minutes to form an interlayer. The rate of elongation of the interlayer was measured. The result is shown in Table 1.

Example 4

Silica sol was applied to an ETFE film the surface of which was subjected to corona discharge treatment so that the thickness after drying would be 1 μm, and dried at 100° C. for 30 minutes to form an interlayer. The rate of elongation of the interlayer was measured. The result is shown in Table 1.

TABLE 1

| | Coating fluid for interlayer | Mass remaining ratio at 500° C. (%) | Thickness (μm) | Rate of elongation (%) | Initial surface appearance |
|---|---|---|---|---|---|
| Ex. 1 | Organic-inorganic hybrid polymer solution A | 65 | 1 | 100 | Good |
| Ex. 2 | Organic-inorganic hybrid polymer solution B | 77 | 1 | 80 | Good |
| Ex. 3 | Organic-inorganic hybrid polymer solution C | 36 | 1 | 150 | Good |
| Ex. 4 | Silica sol | — | 1 | 0 | Cracking |

(Curing Agents)

Tin curing agent 1: PSH-01 manufactured by JSR Corporation

Tin curing agent 2: PSH-10 manufactured by JSR Corporation

Zirconia curing agent: GLASCA HPC406H, manufactured by JSR Corporation

Example 5

To an ETFE film the surface of which was subjected to corona discharge treatment, a coating fluid prepared by adding 3 parts by mass of tin curing agent 1 to 100 parts by mass of organic-inorganic hybrid polymer solution A, was applied so that the thickness after drying would be 2 μm, and dried at 100° C. for 30 minutes to form an interlayer. To the interlayer, a coating fluid comprising 100 parts by mass of titanium oxide photocatalyst coating liquid A and 6 parts by mass of tin curing agent 2 diluted with a solvent, was applied so that the thickness after drying would be 0.3 μm and dried at 100° C. for 30 minutes to form a photocatalyst layer. The obtained film for a membrane structure was evaluated. The results are shown in Table 2.

Example 6

A film for a membrane structure was obtained in the same manner as in Example 5 except that the thickness of the photocatalyst layer was 0.1 μm. The obtained film for a membrane structure was evaluated. The results are shown in Table 2.

Example 7

To an ETFE film the surface of which was subjected to corona discharge treatment, a coating fluid prepared by adding 6 parts by mass of zirconia curing agent (GLASCA HPC406H, manufactured by JSR Corporation) to 100 parts by mass of organic-inorganic hybrid polymer solution A, was applied so that the thickness after drying would be 1 μm, and dried at 100° C. for 30 minutes to form an interlayer. To the interlayer, a coating fluid comprising 100 parts by mass of titanium oxide photocatalyst coating liquid A and 6 parts by mass of zirconia curing agent diluted with a solvent, was applied so that the thickness after drying would be 0.3 μm and dried at 100° C. for 30 minutes to form a photocatalyst layer. The obtained film for a membrane structure was evaluated. The results are shown in Table 2.

Example 8

To an ETFE film the surface of which was subjected to corona discharge treatment, a coating fluid prepared by adding 6 parts by mass of zirconia curing agent to 100 parts by mass of organic-inorganic hybrid polymer solution A was applied so that the thickness after drying would be 2 μm, and dried at 100° C. for 30 minutes to form an interlayer. To the interlayer, titanium oxide photocatalyst coating liquid B was applied so that the thickness after drying would be 0.3 μm, and dried at 100° C. for 30 minutes to form a photocatalyst layer. The obtained film for a membrane structure was evaluated. The results are shown in Table 2.

Example 9

To an ETFE film the surface of which was subjected to corona discharge treatment, a coating fluid prepared by adding 6 parts by mass of zirconia curing agent to 100 parts by mass of organic-inorganic hybrid polymer solution A was applied so that the thickness after drying would be 2 μm, and dried at 100° C. for 30 minutes to form an interlayer. To the interlayer, titanium oxide photocatalyst coating liquid C was applied so that the thickness after drying would be 0.1 μm, and dried at 100° C. for 30 minutes to form a photocatalyst layer. The obtained film for a membrane structure was evaluated. The results are shown in Table 2.

Example 10

To an ETFE film the surface of which was subjected to corona discharge treatment, organic-inorganic hybrid polymer solution A was applied so that the thickness after drying would be 2 μm, and dried at 100° C. for 30 minutes to form an interlayer. To the interlayer, a coating fluid comprising 100 parts by mass of titanium oxide photocatalyst coating liquid A and 6 parts by mass of zirconia curing agent diluted with a solvent was applied so that the thickness after drying would be 0.3 μm, and dried at 100° C. for 30 minutes to form a photocatalyst layer. The obtained film for a membrane structure was evaluated. The results are shown in Table 2.

Example 11

To an ETFE film the surface of which was subjected to corona discharge treatment, organic-inorganic hybrid polymer solution B was applied so that the thickness after drying would be 2 μm, and dried at 100° C. for 30 minutes to form an interlayer. To the interlayer, a coating fluid comprising 100 parts by mass of titanium oxide photocatalyst coating liquid D diluted with a solvent was applied so that the thickness after drying would be 0.06 μm, and dried at 100° C. for 30 minutes to form a photocatalyst layer. The obtained film for a membrane structure was evaluated. The results are shown in Table 2.

Example 12

To an ETFE film the surface of which was subjected to corona discharge treatment, a coating fluid prepared by adding 3 parts by mass of tin curing agent 1 added to 100 parts by mass of organic-inorganic hybrid polymer solution A was applied so that the thickness after drying would be 2 μm, and dried at 100° C. for 30 minutes to form an interlayer. To the interlayer, a coating fluid comprising 100 parts by mass of titanium oxide photocatalyst coating liquid A and 6 parts by mass of tin curing agent 2 diluted with a solvent was applied so that the thickness after drying would be 0.3 μm, and dried at 100° C. for 30 minutes to form a photocatalyst layer. To the photocatalyst layer, a coating fluid comprising a surfactant (ADEKA NOL BO901, manufactured by ADEKA CORPORATION) diluted with a solvent was applied so that the thickness after drying would be 0.1 μm, and dried at 100° C. for 5 minutes to form a water-soluble protective layer. The obtained film for a membrane structure was evaluated. The results are shown in Table 2.

Example 13

To an ETFE film the surface of which was subjected to corona discharge treatment, titanium oxide photocatalyst coating liquid D was applied so that the thickness after drying would be 0.06 μm, and dried at 100° C. for 30 minutes to form a photocatalyst layer. The obtained film was evaluated. The results are shown in Table 2.

Example 14

To an ETFE film the surface of which was subjected to corona discharge treatment, a coating fluid comprising 100 parts by mass of titanium oxide photocatalyst coating liquid A and 6 parts by mass of tin curing agent 2 diluted with a solvent, was applied so that the thickness after drying would be 0.3 μm, and dried at 100° C. for 30 minutes to form a photocatalyst layer. The obtained film was evaluated. The results are shown in Table 2.

Example 15

To an ETFE film the surface of which was subjected to corona discharge treatment, a coating fluid comprising titanium oxide photocatalyst coating liquid E diluted with a solvent was applied so that the thickness after drying would be 0.3 μm, and dried at 100° C. for 30 minutes to form a photocatalyst layer. The obtained film was evaluated. The results are shown in Table 2.

Example 16

To an ETFE film the surface of which was subjected to corona discharge treatment, organic-inorganic hybrid polymer solution C was applied so that the thickness after drying would be 4 μm, and dried at 100° C. for 30 minutes to form an interlayer. To the interlayer, a coating fluid comprising titanium oxide photocatalyst coating liquid E diluted with a solvent was applied so that the thickness after drying would be 0.3 μm, and dried at 100° C. for 30 minutes to form a photocatalyst layer. The obtained film for a membrane structure was evaluated. The results are shown in Table 2.

Example 17

To an ETFE film the surface of which was subjected to corona discharge treatment, a coating fluid prepared by adding 6 parts by mass of zirconia curing agent to 100 parts by mass of organic-inorganic hybrid polymer solution A was applied so that the thickness after drying would be 2 μm, and dried at 100° C. for 30 minutes to form an interlayer. To the interlayer, titanium oxide photocatalyst coating liquid E was applied so that the thickness after drying would be 0.2 μm, and dried at 100° C. for 30 minutes to form a photocatalyst layer. The obtained film for a membrane structure was evaluated. The results are shown in Table 2.

TABLE 2

| Ex. | Interlayer | | | Photocatalyst layer | | | Protective layer |
|---|---|---|---|---|---|---|---|
| | Coating fluid for interlayer | Curing agent | Thickness (μm) | Composition for photocatalyst layer | Curing agent | Thickness (μm) | |
| 5 | A | Sn | 2 | A | Sn | 0.3 | — |
| 6 | A | Sn | 2 | A | Sn | 0.1 | — |
| 7 | A | Zr | 1 | A | Zr | 0.3 | — |
| 8 | A | Zr | 2 | B | Nil | 0.3 | — |
| 9 | A | Zr | 2 | C | Nil | 0.1 | — |
| 10 | A | Nil | 2 | A | Zr | 0.3 | — |
| 11 | B (Two-part system) | | 2 | D | Nil | 0.06 | — |
| 12 | A | Sn | 2 | A | Sn | 0.3 | Present |
| 13 | — | — | — | D | Nil | 0.06 | — |
| 14 | — | — | — | A | Sn | 0.3 | — |
| 15 | — | — | — | E | Nil | 0.3 | — |
| 16 | C | Nil | 4 | E | Nil | 0.3 | — |
| 17 | A | Zr | 2 | E | Nil | 0.2 | — |

TABLE 2-continued

| | Initial | | | | After weather resistance test | | |
| --- | --- | --- | --- | --- | --- | --- | --- |
| Ex. | Surface appearance | Total light transmittance (%) | Haze (%) | Adhesion | Surface appearance | Water contact angle (°) | Change in haze (%) |
| 5 | Good | 89.7 | 7.6 | ○ | Good | 28 | 0.1 |
| 6 | Good | 90.5 | 7.8 | ○ | Good | 15 | 0.7 |
| 7 | Good | 89 | 7.6 | ○ | Good | ≦5 | 0.8 |
| 8 | Good | 87.7 | 7.8 | ○ | Good | ≦5 | 4.7 |
| 9 | Good | 88.1 | 7.3 | ○ | Good | ≦5 | 3.8 |
| 10 | Good | 90.7 | 13.9 | ○ | Good | ≦5 | 1.8 |
| 11 | Good | 90.5 | 8.1 | ○ | Good | 38 | 0.3 |
| 12 | Good | 90 | 7.8 | ○ | Good | ≦5 | 0.3 |
| 13 | Good | 92.1 | 8 | X | Whitening | 122 | 19 |
| 14 | Good | 87.1 | 7.9 | X | Good | 93 | 0.5 |
| 15 | Good | 90.3 | 7.7 | ○ | Good | 87 | 0.2 |
| 16 | Good | 91.2 | 9.8 | ○ | Cracking | ≦5 | 47 |
| 17 | Good | 92.9 | 7.2 | ○ | Good | ≦5 | 0 |

The film for a membrane structure of the present invention is useful as the roof, the outer wall, etc. for facilities such as sports facilities (such as a swimming pool, a gymnasium, a tennis court and a football ground) warehouses, halls, exhibition halls and horticultural facilities (such as a horticultural greenhouse and an agricultural greenhouse).

The entire disclosure of Japanese Patent Application No. 2006-109593 filed on Apr. 12, 2006 including specification, claims, drawings and summary are incorporated herein by reference in its entirety.

What is claimed is:

1. A film for a membrane structure, wherein the film comprises:
    a film substrate;
    a photocatalyst layer; and
    an interlayer interposed between the film substrate and the photocatalyst layer,
    wherein the film substrate comprises at least one fluororesin selected from the group consisting of an ethylene/tetrafluoroethylene copolymer, a tetrafluoroethylene/hexafluoropropylene copolymer, a tetrafluoroethylene/perfluoro(alkyl vinyl ether) copolymer, a polyvinyl fluoride and a polyvinylidene fluoride,
    wherein the interlayer comprises a zirconia curing agent and an organic-inorganic hybrid polymer obtained by hydrolyzing/co-condensing at least one member selected from the group consisting of an organosilane, a hydrolysate of an organosilane and a condensate of an organosilane, and a silyl group-containing organic polymer, wherein the mass remaining ratio of the organic-inorganic hybrid polymer is from 50% to 80% at 500° C. measured by thermogravimetric analysis,
    wherein the photocatalyst layer comprises a zirconia curing agent and a photocatalyst,
    wherein the film substrate exhibits a surface tension of at least 38 mN/m as a result of having been subjected to a corona discharge surface treatment,
    wherein adhesion between the film substrate and the interlayer is at least 85% as measured by a cross-cut method in accordance with JIS K5600,
    wherein the water contact angle on a surface of the photocatalyst layer is at most 5° as measured after the following weather resistance test, and
    wherein the change in haze is at most 3% as measured before and after the following weather resistance test:
    weather resistance test: while the film is irradiated with ultraviolet rays at a wavelength of from 300 nm to 400 nm at an intensity of 100 mW/cm$^2$, a cycle comprising (i) irradiation with ultraviolet rays at a temperature of 63° C. at a relative humidity of 50% RH for 10 hours, (ii) a shower for 20 seconds, (iii) moisture condensation for 2 hours, and (iv) a shower for 20 seconds, is repeatedly carried out for 200 hours.

2. The film for a membrane structure according to claim 1, which has a total light transmittance of at least 80% as measured in accordance with JIS K7105.

3. The film for a membrane structure according to claim 1, wherein the film substrate has a thickness of from 50 μm to 500 μm, an Elmendorf tear strength of at least 7 N as measured in accordance with JIS K7128, and a tensile strength of at least 46 MPa as measured in accordance with JIS K7127.

4. The film for a membrane structure according to claim 1, wherein the fluororesin is an ethylene/tetrafluoroethylene copolymer.

5. The film for a membrane structure according to claim 1, wherein the interlayer has a rate of elongation of from 60% to 120%.

* * * * *